(12) United States Patent
Lu et al.

(10) Patent No.: US 8,995,271 B2
(45) Date of Patent: Mar. 31, 2015

(54) COMMUNICATIONS FLOW ANALYSIS (75) Inventors: Wei Lu, Austin, TX (US); Orion Suydam, Austin, TX (US); Gregory K Adams, Roswell, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 381 days.

(21) Appl. No.: 13/459,949

(22) Filed: Apr. 30, 2012

(65) Prior Publication Data
US 2013/0286887 A1 Oct. 31, 2013

(51) Int. Cl.
*H04L 12/26* (2006.01)
*H04L 12/24* (2006.01)

(52) U.S. Cl.
CPC ............... *H04L 43/10* (2013.01); *H04L 41/14* (2013.01); *H04L 43/106* (2013.01)
USPC ............... 370/235; 370/392; 726/13; 726/25

(58) Field of Classification Search
None
See application file for complete search history.

(56) References Cited

U.S. PATENT DOCUMENTS

| | | | |
|---|---|---|---|
| 7,185,368 B2 * | 2/2007 | Copeland, III ................. | 726/25 |
| 7,266,088 B1 * | 9/2007 | Virgin ........................... | 370/252 |
| 7,519,990 B1 | 4/2009 | Xie et al. | |
| 7,565,426 B2 * | 7/2009 | Jones et al. .................... | 709/224 |
| 7,729,271 B2 * | 6/2010 | Tsuchiya et al. .............. | 370/252 |
| 7,911,975 B2 | 3/2011 | Droz et al. | |
| 8,054,760 B2 | 11/2011 | Hao et al. | |
| 8,346,960 B2 * | 1/2013 | Spatscheck et al. .......... | 709/238 |
| 2005/0044208 A1 * | 2/2005 | Jones et al. ................... | 709/224 |
| 2005/0213504 A1 * | 9/2005 | Enomoto et al. .............. | 370/235 |
| 2008/0320585 A1 * | 12/2008 | Ansari et al. .................. | 726/13 |
| 2010/0296402 A1 | 11/2010 | Fraccalvieri et al. | |
| 2013/0195457 A1 * | 8/2013 | Levy et al. .................... | 398/66 |
| 2014/0164471 A1 * | 6/2014 | Keels et al. ................... | 709/201 |

FOREIGN PATENT DOCUMENTS

WO WO-2011126215 10/2011

OTHER PUBLICATIONS

Nguyen, H.A. et al., "Network Traffic Anomalies Detection and Identification with Flow Monitoring", 5th IFIP International Conference on Wireless and Optical Communications Networks, May 5-7, 2008, pp. 1-5.

* cited by examiner

*Primary Examiner* — Michael J Moore, Jr.
(74) *Attorney, Agent, or Firm* — Hewlett-Packard Patent Department (57) ABSTRACT

In one implementation, a communications flow analysis system determines whether a communications flow between a source and a destination should be retained. If the communications flow should be retained, the communications flow analysis system injects an extraneous data set into the communications flow in response to determining that the communications flow should be retained.

20 Claims, 6 Drawing Sheets

COMMUNICATIONS FLOW ANALYSIS

BACKGROUND

Communications network traffic analysis systems monitor data exchanged within a communications network (e.g., among hosts connected to a communications link) to identify malicious, erratic, non-compliant, or otherwise of interest activity. Some communications network traffic analysis systems perform monitoring and analysis on a per-data-packet basis. That is, such communications network traffic analysis systems analyze data packets exchanged via a communications network with little or no context or state information related to those data packets.

Other communications network traffic analysis systems monitor and analyze data exchanged within a communications network using communications flows. Such communications network traffic analysis systems can be referred to as communications flow analysis systems. A communications flow is a group of data sets such as data packets provided from one host to another host. Accordingly, such communications network traffic analysis systems can, for example, analyze data packets exchanged between hosts in a communications network using context or state information related to those data packets.

Because a communications flow can include data sets provided from one host to another host over a period of time and off-line analysis may be desired, rather than analyze the data sets of a communications flow in real-time (e.g., as the data sets are sent from one host to another) some such communications network traffic analysis systems store the communications flow and analyze the communications flow off-line. For example, some communications network traffic analysis systems store the data sets of a communications flow at a data store, and analyze the data sets stored at the data store later (e.g., after the flow has terminated) to determine whether the communications flow indicates any activity that is malicious, erratic, non-compliant, or otherwise of interest.

DETAILED DESCRIPTION

Communications flow analysis systems that store communications flows (e.g., the data sets that are included within communications flow) and analyze those communications flows off-line can have significant data storage demands. For example, storing all the data exchanged via hosts in communication one with another via a 10-, 40-, or 100-Gbps communications link will generate 4.5 TB, 18 TB, or 45 TB of data per hour. Such storage requirements grow rapidly in environments such as, for example, datacenters used to support cloud-based computing which include dozens, hundreds, or more of such communications links.

Additionally, analysis of such stored communications flows can require significant time and computational resources to determine whether a communications flow is of interest and should be further analyzed. For example, analyses performed to determine whether a communications flow is of interest (e.g., appears to exhibit malicious, erratic, non-compliant, or undesired characteristics) can be expensive in terms of computational time and complexity. Thus, such communications flow analysis systems can require significant investments in data storage and computational resources to perform the analyses required to remove communications flows that are of interest to free space at the data store.

Communications flow analysis systems discussed herein monitor communications flows in real-time (i.e., at approximately the same time as the data sets of the communications flows are exchanged via a communications link) to determine whether those communications flows should be retained (e.g., are of interest), and identify communications flows of interest by injecting (or adding) extraneous data sets to those communications flows. As discussed in detail herein, extraneous data sets do not compromise the integrity of the communications flows, and can therefore be injected into the communications flows without adversely affecting the communications flows (e.g., without causing the communications flows to become non-compliant with a protocol or terminate prematurely).

After a communications flow has terminated and is stored at the data store, such communications flow analysis systems can efficiently identify the extraneous data sets included in communications flows stored at a data store. This allows such communications flow analysis systems to manage the data store with enhanced efficiency. For example, the communications flows that include one or more extraneous data sets can be marked or flagged for further analysis, and the communications flows that do not include one or more extraneous data sets can be removed from the data store to free storage space in the data store for new communications flows.

Figure 1:
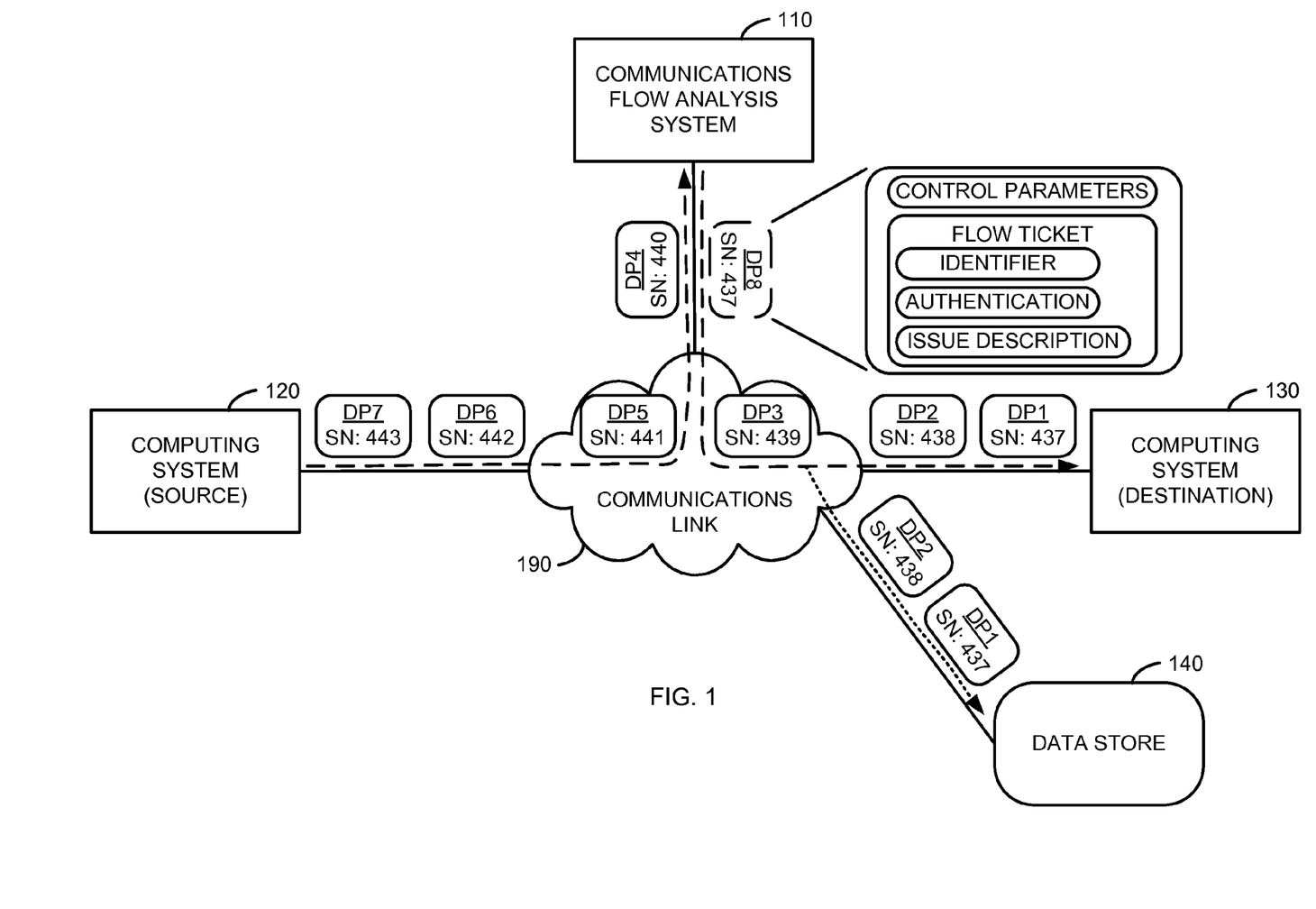
FIG. 1 is a schematic block diagram of an environment including a communications flow analysis system, according to an implementation.

FIG. 1 is a schematic block diagram of an environment including a communications flow analysis system, according to an implementation. The environment illustrated in FIG. 1 includes communications flow analysis system 110, computing system 120, computing system 130, data store 140, and communications link 190. Computing systems 120 and 130 are computing systems such as a desktop computer, a computer server, a notebook computer, a personal digital assistant, a smartphone, a tablet, or a network-connected device (e.g., a printer, television, gaming console, appliance such as a refrigerator, or other device configured to communicate via a communications link such as a communications network). Data store 140 is a system or device configured to store data. For example, data store 140 can be hard disk drive, a solid-state drive, an array of hard disk drives, an array of solid state drives, or a combination thereof. As other examples, data store 140 can be a logical or virtualized data store such as a database, a file system, a cloud- or network-attached data store.

Communications link 190 includes devices, services, or combinations thereof that define communications paths between communications flow analysis system 110, computing system 120, computing system 130, data store 140, and/or other devices or services (not shown). For example, communications link 190 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 190 can include communications networks such as an intranet, the Internet, other telecommunications networks, or a combination thereof. Additionally, communications link 190 can include proxies, routers, switches, gateways, bridges, load balancers, and similar communications devices. Furthermore, the connections and communications paths (e.g., between communications link 190 and computing system 120 and computing system 130) illustrated in FIG. 1 are logical and do not necessarily reflect physical connections.

A communications flow is illustrated between computing system 120 (the source of the communications flow) and computing system 130 (the destination of the communications flow). As discussed above, a communications flow is a group of data sets provided from a source (or source host) to a destination (or destination host). For example, in a packet switched network, a communications flow is a group of data packets sent from one host (the source) to another host (the destination).

As illustrated in FIG. 1, the communications flow includes data packets DP1, DP2, DP3, DP4, DP5, DP6, and DP7. A data packet is a data set that includes control parameters and encapsulates data (or information) provided from one host (e.g., a computing system or an application hosted at a computing system) to another host. The control parameters can include, for example: protocol information related to a communications link via which a data packet is transmitted; a source address such as an Internet Protocol (IP) address or a unique device identifier such as a media access control (MAC) address of a source host for a data packet; a destination address; one or more identifiers of a data packet such as a sequence number or a timestamp; a type or class identifier that describes characteristics of a data packet or data encapsulated within a data packet; a length of or number of bytes within a data packet; and verification information such as a checksum or signature of a data packet. Each of data packets DP1-DP7 include a control parameters with a sequence number (labeled "SN" in FIG. 1). Data packet DP1 has sequence number 437, data packet DP2 has sequence number 438, data packet DP3 has sequence number 439, data packet DP4 has sequence number 440, data packet DP5 has sequence number 441, data packet DP6 has sequence number 442, and data packet DP7 has sequence number 443.

In the example illustrated in FIG. 1, communications link 190 is configured to cause the communications flow to proceed from computing system 120 to communications flow analysis system 110. For example, data sets (e.g., data packets) of the communications flow that include an address of computing system 130 as a destination address of those data sets are routed to communications flow analysis system 110. Communications flow analysis system 110 monitors the communications flow and forwards the data packets of the communications flow to computing system 130. For example, a router or switch of communications link can be configured to forward data packets to communications flow analysis system 110. As another example, communications flow analysis system 110 can be hosted at a router, switch, or other computing device physically or logically between computing systems 120 and 130 (e.g., within communications link 190). Additionally, in the example of FIG. 1, communications link 190 is configured to forward data packets included in the communications flow to data store 140.

Communications flow analysis system 110 monitors the communications flow to determine whether the communications flow exhibits characteristics (or properties or traits) of communications flows that are of interest and should be retained (e.g., stored at data store 140). For example, communications flow analysis system 110 processes or analyzes data packets DP1-DP7 to determine whether the communications flow exhibits traffic patterns, data values, or other characteristics that indicate malicious, erratic, non-compliant, or undesirable activity via the communications flow. As specific example, communications flow analysis system 110 can include one or more modules (or engines) such as an intrusion detection engine, an intrusion prevention engine, an application visibility engine, a data leak detection engine, an application content visibility engine, a malware detection engine, an application firewall engine, or application proxy engine to identify activity related to intrusion, exposed application data or features, malware, firewall violations, or proxy violations, for example. The communications flow can be of interest if it exhibits characteristics of undesired activity, suspicious activity, or activity that should be analyzed according to a policy.

More specifically, in the example illustrated in FIG. 1, data packets in the communications flow provided by computing system 120 to computing system 130 are provided by communications link 190 (or one or more components thereof) to communications flow analysis system 110. Communications flow analysis system 110 analyzes the data packets (e.g., using the modules or engines discussed above) individually, in the context of other data packets in the communications flow, or a combination thereof to determine whether the communications flow is of interest. Communications flow analysis system 110 then forwards the data packets to computing system 130 via communications link 190. In some implementations, communications flow analysis system 110 forwards the data packets to computing system 130 unaltered. For example, a control parameter for a source address of the data packets can include a source address of computing system 120 rather than communications flow analysis system 110. Accordingly, computing system 130 would perceive the data packets (or the communications flow) to originate from computing system 120.

The data packets of the communications flow are also forwarded to data store 140, which stores the communications flow. As discussed above, communications link 190 can be configured to forward data packets to data store 140. In some implementations, communications flow analysis system 110 forwards data packets of the communications flow to data store 140. In some implementations, data store 140 stores the data packets of the communications flow together (e.g., in a directory of a file system, within a group of related files within a file system, within a table of a relational database, or within an object or group of related object of an object database).

If communications flow analysis system 110 determines that the communications flow should be retained (e.g., one or more of the modules or engines provides an indication that the communications flow is of interest), communications flow analysis system 110 injects an extraneous data set into the communications flow. An extraneous data set is a data set that does not compromise the integrity of a communications flow when added to (or injected into) the communications flow. For example, an extraneous data set can be an extraneous data packet or group of extraneous data packets that are ignored or disregarded by a destination of a communications flow. Accordingly, extraneous data sets can be dependent or vary based on the protocol of a communications flow. Such protocols can be physical layer protocols, transport layer protocols, network layer protocols, applications layer protocols, or other protocols.

Because extraneous data sets do not compromise the integrity of a communications flow, extraneous data sets can be used to mark or identify a communications flow of interest. That is, systems or processes that implement a protocol of the communications flow (e.g., as implemented at a destination of a communications flow) are unaffected by extraneous data sets injected into the communications flow (e.g., such systems or processes can ignore or disregard the extraneous data sets).

As a specific example, an extraneous data set can be a duplicate data set such as duplication data packet. A duplicate data packet is a data packet that includes control parameters that are given values that are identical to the values of those control parameters for another data packet in a communications flow. For example, a sequence number, timestamp, length, other control parameters, or a combination thereof in a duplicate data packet can be identical to another data packet. In some implementations, not all control parameters are identical to those of another data packet in a duplicate data packet. For example, a checksum, length, or other control parameters of a duplicate data packet can be different from another data packet.

As a specific example, for the Transport Control Protocol (TCP), each data packet includes a sequence number. A duplicate data packet is a data packet that includes as a sequence number the sequence number of a prior data packet. The duplicate data packet will be disregarded (or ignored) by the destination of the communications flow because another data packet with the same sequence number has already been received, and the communications flow will not be adversely affected. Such duplicate data packets can be useful in relation to a communications flow in which information is secured according to the Secure Socket Layer (SSL) protocol or Transport Layer Security (TLS) protocol. Because the SSL and TLS protocols can be implemented above (i.e., at a higher layer) than TCP, such duplicate data packets will be disregarded by a network stack and will not be received by the destination of the communications flow (e.g., an application that processes the secured information). Thus, such duplicate data packets will not disrupt the integrity of the secured information within the communications flow. Indeed, the destination of the communications flow that verifies the integrity of the communications flow according to the SSL and/or TLS protocols will not receive the duplicate data packets.

As another example, a timestamp of an earlier data packet can be included within a later data packet to cause the later data packet to be a duplicate data packet of the earlier data packet. As yet another example, of an extraneous data set can be a data set such as a data packet that is compliant with a protocol, but is not processed or handled by a destination. For example, The Internet Control Message Protocol (ICMP) includes a number of types or classes of messages that are identified by the control parameters within headers of data packets including ICMP messages. Some destinations of communications flows (e.g., network stacks, applications, or operating systems) do not handle or process all ICMP message types. Rather, such destinations disregard data packets that identify the ICMP message types those destinations do not handle. Accordingly, an extraneous data packet can be a data packet that conforms to a standard or protocol, and includes control parameters with values that cause the extraneous data packet to be disregarded, not interpreted, or ignored by a destination of the communications flow. In other implementations, an extraneous data set can be other data sets that do not compromise the integrity of a communications flow.

Systems or processes that search or look for the extraneous data sets can efficiently distinguish the extraneous data sets from other data sets of a communications flow. Referring, for example, to TCP sequence numbers, a communications flow analysis system can identify an extraneous data set within a communications flow stored at a data store by processing (e.g., parsing) the headers of the data packets of the communications flow. The communications flow analysis system can then determine whether the extraneous data set includes a flow ticket indicating that the extraneous data set was injected into the communications flow by a communications flow analysis system. If the extraneous data set includes a flow ticket, further analysis can be applied to the communications flow. If the extraneous data set does not include a flow ticket, the communications flow can be removed from the data store to free storage space for other communications flows.

Referring to FIG. 1, after analyzing data packet DP3 (or after analyzing data packets DP1, DP2, and DP3 of the communications flow) communications flow analysis system 110 determines that the communications flow is of interest and should be retained. Accordingly, communications flow analysis system 110 generates an extraneous data set. In the example illustrated in FIG. 1, the extraneous data set is data packet (or extraneous data packet) DP8. In this example, data packet DP8 includes the sequence number 437 of data packet DP1. Accordingly, data packet DP8 can be said to be a duplicate data packet of data packet DP1.

Although some portions such as the sequence number of data packet DP8 are identical to those of data packet DP1, other portions differ from those of data packet DP1. For example, the payload or content of data packet DP8 is different from that of data packet DP1. As illustrated in FIG. 1, data packet DP8 includes a flow ticket. A flow ticket is data (or a data set) that marks or flags an extraneous data set as injected to identify a communications flow of interest. For example, due to the operation of some protocols, extraneous data sets such as copies of data sets can be injected into or added to a communications flow by operation of a communications network. For example, a misconfiguration of a router or switch, duplicate communications paths, or other factors can result in multiple copies of a data packet sent via a communications link. Because such extraneous data sets can arise in communications flow, communications flow analysis system 110 can insert a flow ticket into data packet DP8 to demonstrate that data packet DP8 is intended to identify the communications flow as of interest.

A flow ticket can include various information to demonstrate that the extraneous data set including the flow ticket is intended to identify a communications flow of interest (e.g., a communications flow that should be retained). Said differently, the flow ticket within the extraneous data set identifies a communications flow as a communications flow of interest. For example, as illustrated in FIG. 1, a flow ticket can include: an identifier of the flow ticket such as a unique identifier or globally unique identifier or tag of the flow ticket; a description or code of the issue or basis for which the communications flow including the flow ticket was identified as of interest; authentication information such as a signature (e.g., an encrypted hash or digest) of the flow ticket and a certificate (e.g., issued in relation to communications flow analysis system 110) for validating the signature; or a combination thereof.

Furthermore, in some implementations data packet DP8 can have a length (e.g., a number of bytes or other symbols)

equal to a length of data packet DP1. Accordingly, if the flow ticket included in data packet DP8 has a length less than a length of the content of data packet DP1, the flow ticket can be padded (e.g., extra zero or null values added) such that data packet DP8 has the length of data packet DP1. Alternatively, if the flow ticket has a length that is greater than a length of data packet DP1, the extraneous data set generated at communications flow analysis system 110 can include two (or more) duplicate data packets. One part of the flow ticket can be included in one duplicate data packet to cause a length of that data packet to be the same as a length of data packet DP1, and another part of the flow ticket can be included in the other duplicate data packet. Additionally, the other duplicate data packet can be padded to cause a length of the duplicate data packet to be the same as a length of data packet DP1.

Referring specifically to the example illustrated in FIG. 1, communications flow analysis system 110 injects data packet DP8 (the extraneous data set) into the communications flow by forwarding data packet DP8 to computing system 130. In some implementations, control parameters for a source address and a destination address of data packet DP8 include an address of computing system 120 and computing system 130, respectively, such that data packet DP8 appears to be part of the communications flow between computing system 120 and computing system 130 (i.e., includes the same source address and destination address as other data packets in the communications flow).

When data packet DP8 is received at computing system 130 in this example, data packet DP8 is disregarded because data packet DP8 is a duplicate data set of data set DP1. More specifically, in this example, data packet DP8 is disregarded because data packet DP8 includes a common sequence number with data packet DP1 which was previously received at computing system 130. Thus, data packet DP8 (the extraneous data set injected into the communications flow) does not adversely affect (e.g., interrupt or cause premature termination of) the communications flow.

Additionally, data packet DP8 is provided to data store 140 and is stored together with the other data packets of the communications flow at data store 140. Communications flow analysis system 110 or a related agent (e.g., a module hosted at a computing system) can at a later time (e.g., after the communications flow has terminated) access data store 140 and scan communications flows to determine whether the communications flows include a flow ticket within an extraneous data set. As discussed above, the communications flows that include a flow ticket can be further analyzed or processed (e.g., to determine whether undesirable activity was performed via those communications flows), and the communications flows that do not include a flow ticket can be removed from data store 140.

Figure 2:
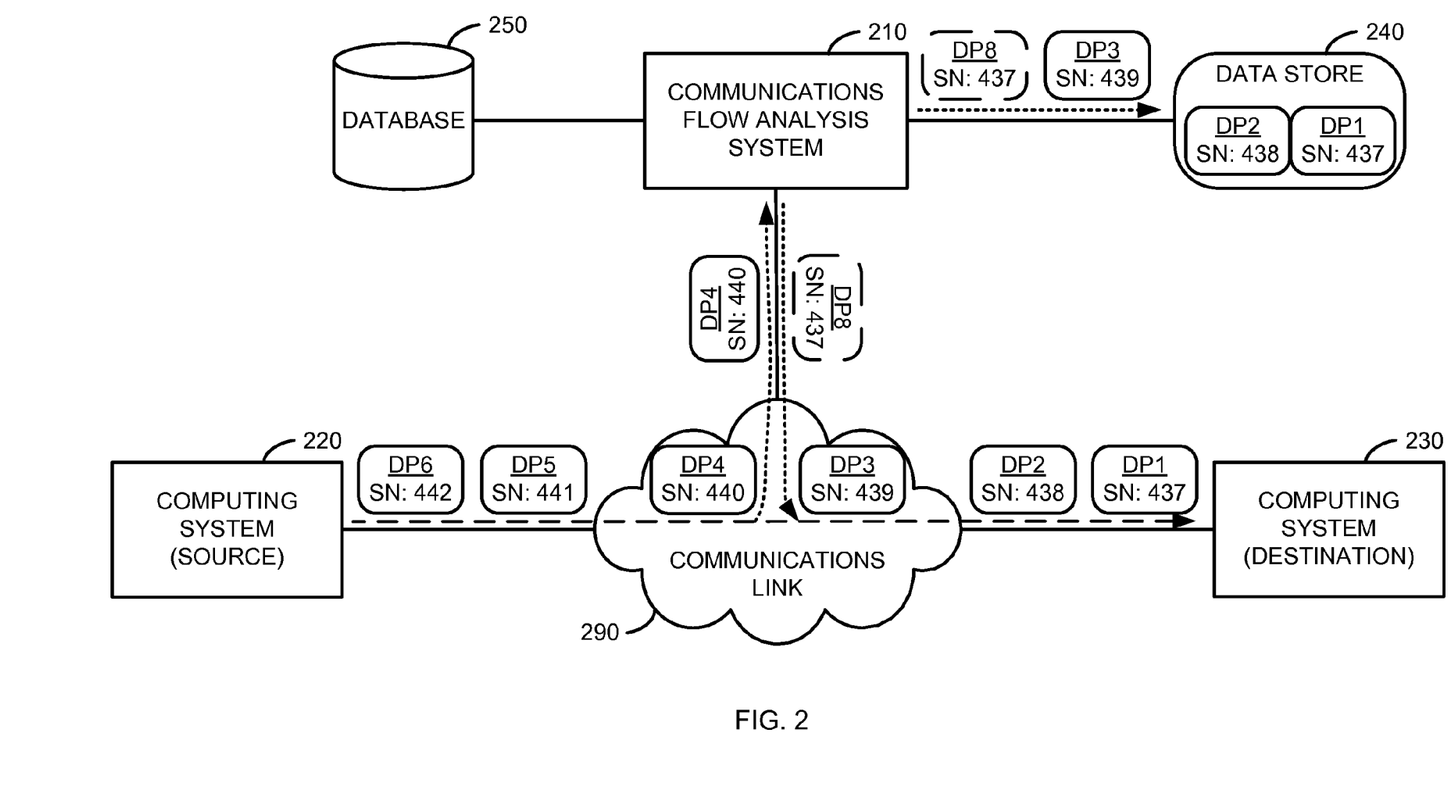
FIG. 2 is a schematic block diagram of another environment including a communications flow analysis system, according to another implementation.

FIG. 2 is a schematic block diagram of another environment including a communications flow analysis system, according to another implementation. Computing system 220, computing system 230, communications flow analysis system 210, data store 240, and communications link 290 illustrated in FIG. 2 similar to computing system 120, computing system 230, communications flow analysis system 210, data store 140, and communications link 190 discussed above in relation to FIG. 1. Moreover, the connections and communications paths (e.g., between communications link 290 and computing system 220 and computing system 230, and between communications flow analysis system 210 and data store 240 and database 250) illustrated in FIG. 2 are logical and do not necessarily reflect physical connections.

The environment including computing system 220, computing system 230, communications flow analysis system 210, data store 240, and communications link 290 is configured to have a different topology than the environment illustrated in FIG. 1. More specifically, in this example, communications link 290 is configured such that the communications flow including data packets DP1-DP6 provided from computing system 220 to computing system 230 are not routed through communications flow analysis system 210. Rather, the communications flow proceeds from computing system 220 through communications link 290 to computing system 230. Additionally, communications link 290 (e.g., a router or switch within communications link 290) forwards a copy of data packets in the communications flow to communications flow analysis system. In other words, rather than redirect the communications flow through a communications flow analysis system as in the example illustrated in FIG. 1, communications link 290 provides a copy of data sets (here, data packets) of the communications flow to communications flow analysis system 210 as illustrated in FIG. 2. Communications flow analysis system 210 receives the data sets (here, data packets) and monitors the communications flow based on the received data sets.

Communications flow analysis system 210 analyzes the communications flow, for example, as discussed above in relation to FIG. 1 and below in relation to FIG. 3, and provides the data packets (or copies thereof) to data store 240 at which the communications flow is stored. Said differently, communications flow analysis system 210 monitors and stores a copy of the communications flow between computing system 220 and computing system 230.

Moreover, communications flow analysis system 210 injects an extraneous data set into the communications flow if communications flow analysis system 210 determines that the communications flow is of interest. For example, as illustrated in FIG. 2, if communications flow analysis system 210 determines that the communications flow is of interest after processing or analyzing data packet DP3, communications flow analysis system 210 can generate data packet DP8 (an extraneous data set). Additionally, communications flow analysis system 210 can inject data packet DP8 into the communications flow by providing data packet DP8 to data store 240 and to communications link 290. That is, data packet DP8 can be added to the copy of the communications flow that is stored at data store 240 and/or added to the communications flow between computing systems 220 and 230. In other words, an extraneous data set can be injected into a communications flow by adding the extraneous data set to that communications flow between hosts (e.g., a source and a destination) or a copy of that communications flow.

As discussed above, in some implementations, data packet DP8 can include an address of computing system 220 in a control parameter for a source address of data packet DP8 and an address of computing system 230 in a control parameter for a destination address of data packet DP8. Thus, data packet DP8 can appear to communications network 290 and computing systems to have been sent to computing system 230 from computing system 220. Accordingly, communications link 290 can receive data packet DP8 from communications flow analysis system 210, and forward data packet DP8 to computing system 230. As discussed above, because data packet DP8 is an extraneous data set, the communications flow will not be adversely affected by data packet DP8. For example, the destination of the communications flow (e.g., computing system 230 or an application hosted at computing system 230) can discard data packet DP8 because data packet DP8 includes a sequence number (here, 437) of data packet DP1 which was previously received at the destination.

In other implementations, communications flow analysis system 210 does not provide data packet DP8 to communications link 290. Thus, data packet DP8 is injected into the copy of the communications flow stored at data store 240, but is not injected into the communications flow between computing systems 220 and 230.

In addition to injecting an extraneous data set into a communications flow in response to determining that the communications flow is of interest, communications flow analysis system 210 can store data related to the communications flow (e.g., a description of the basis for the determination that the communications flow is of interest) at database (or some other data store) 250. For example, the extraneous data set can include a flow ticket having an identifier. Information related to the communications flow can be stored at database 250 such that that information can be accessed at the database using the identifier of the flow ticket. In other words, the information can be stored at rows, tables, objects, or other database structure that are associated with the communications flow based on the identifier of the flow ticket injected into the communications flow. Thus, when a communications flow analysis system identifies the flow ticket within the communications flow stored at data store 240, that communications flow analysis system can access the information using the identifier of the flow ticket.

Additionally, communications flow analysis system 210 can store other and/or additional information related to the communications flow at database 250. For example, after injecting a flow ticket into the communications flow (e.g., injecting an extraneous data set including the flow ticket into the communications flow) based on an indication from a module or engine of communications flow analysis system 210 that the communications flow is (or may be) of interest, communications flow analysis system 210 can determine that the communications flow is (or may be) of interest based on an indication from another module or engine of communications flow analysis system 210.

Rather than inject another extraneous data set (including a flow ticket) into the communications flow, communications flow analysis system 210 can add additional information or update existing information at database 250 using the identifier of the flow ticket to record the subsequent indication. Thus, communications flow analysis system 210 can store information related to the communications flow at database 250 while analyzing the communications flow without injecting multiple extraneous data sets into the communications flow. A communications flow analysis system that later identifies the flow ticket in the communications flow, can access that information at database 250 using the identifier included within the flow ticket.

In some implementations, a communications flow analysis system can implement multiple processes. For example, a communications flow analysis system can implement a first process to monitor (or analyze) a communications flow in real-time and inject one or more extraneous data sets including flow tickets into the communications flow, and a second process to identify communications flows at a data store than include extraneous data sets with flow tickets. In some implementations, each process can be implemented at a unique (from the other) module hosted at a computing system. In some implementations, one communications flow analysis system can implement the first process and another communications flow analysis system can implement the second process. The process illustrated in FIG. 3 is an example of the first process, and the process illustrated in FIG. 4 is an example of the second process.

Figure 3:
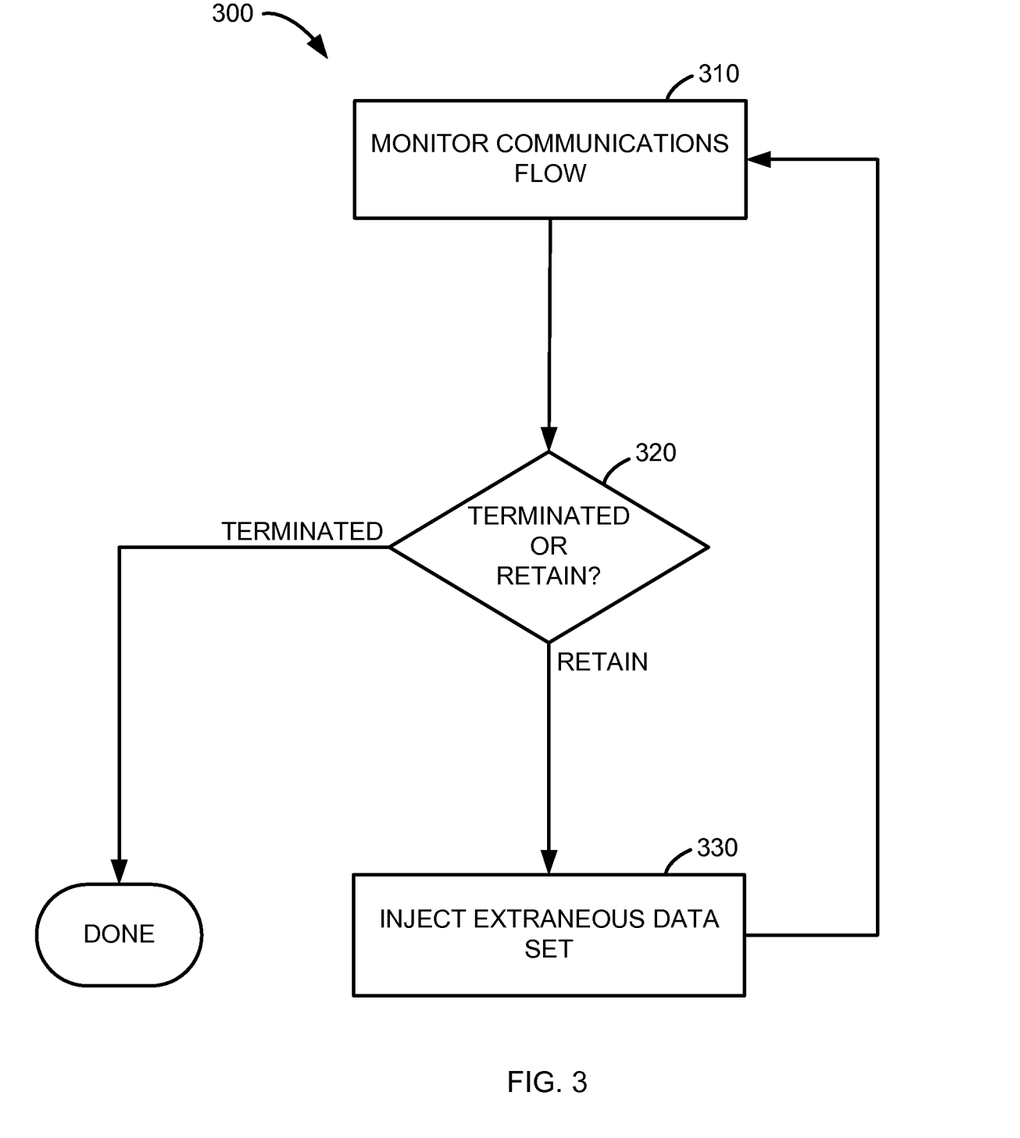
FIG. 3 is a flowchart of a communications flow analysis process, according to an implementation.
Figure 4:
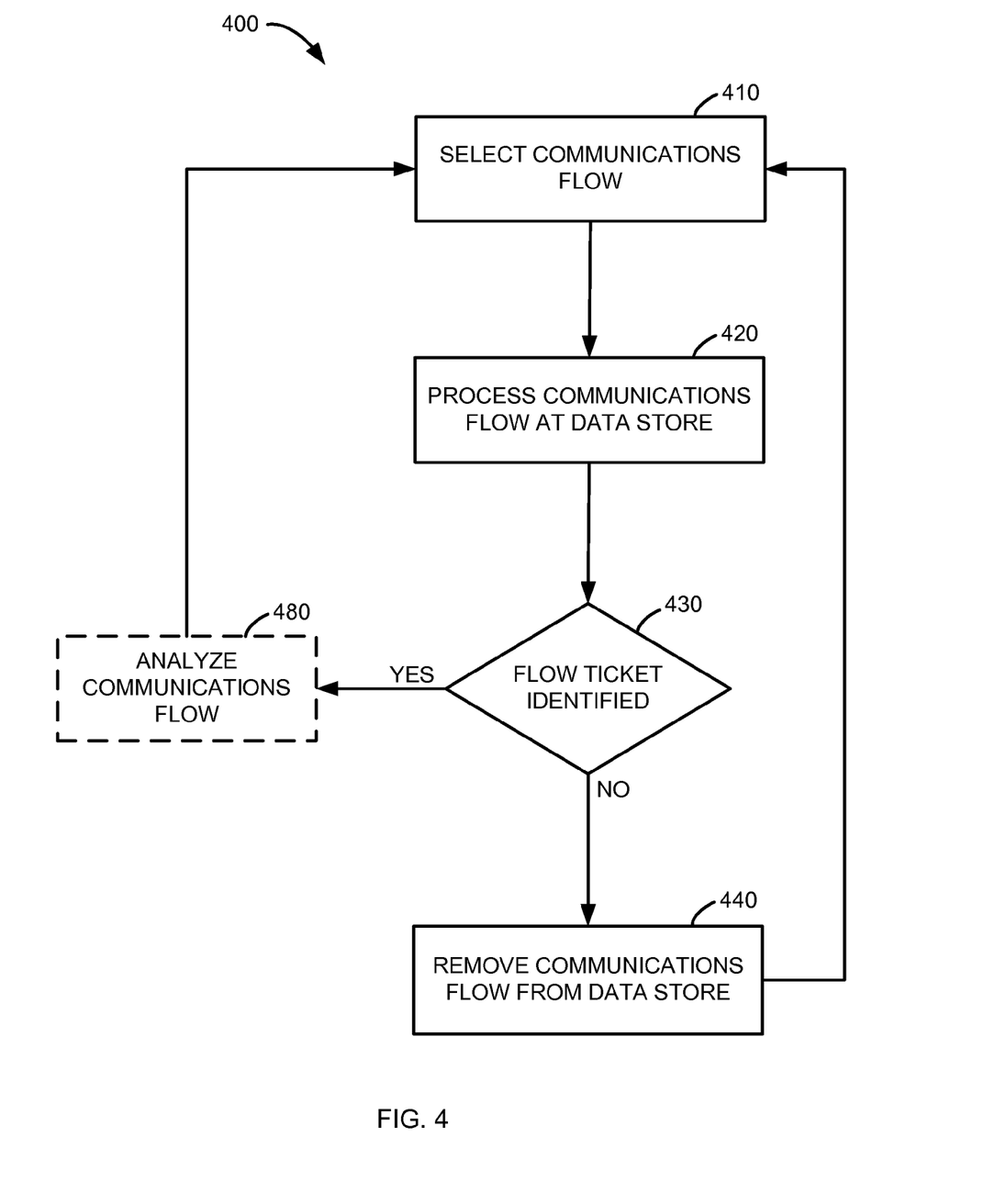
FIG. 4 is a flowchart of a communications flow analysis process, according to an implementation.

FIG. 3 is a flowchart of a communications flow analysis process, according to an implementation. Process 300 can be implemented at, for example, a communications flow analysis system hosted at a computing system. A communications flow is monitored at block 310. That is, data sets (e.g., data packets) of a communications flow are received and analyzed at block 310. For example, as discussed above, a communications flow can be analyzed for traffic patterns, data values, or other characteristics that indicate undesired activity via the communications flow.

If an event such as termination of the communications flow or a determination that the communications flow is of interest and should be retained occurs at block 320, process 300 proceeds to block 330. If the communications flow has terminated, process 300 can complete with respect to that communications flow. In some implementations, process 300 proceeds to monitor another communications flow after the current communications flow terminates.

If the communications flow is (or may be) of interest, the communications flow should be retained, and an extraneous data set is injected into the communications flow at block 330. For example, as discussed above, an extraneous data set including a flow ticket can be stored at a data store within the communications flow and/or can be provided to a destination of the communications flow via a communications network.

As a specific example in relation to a packet switched network, the extraneous data set can be an extraneous data packet with a control parameter for a sequence number that is equal to the sequence number of an earlier-received data packet from the communications flow. Additionally, control parameters for source and destination addresses of the data packet can have values of an address of the source of the communications flow and an address of the destination of the communications flow, respectively. Moreover, the data packet can include a flow ticket within a content portion of the data packet. Thus, the data packet can be injected into the communications flow by providing the data packet to a communications link to which the source and destination of the communications flow are operatively coupled. After the extraneous data set is injected into the communications flow, process 300 proceeds to block 310 and continues to monitor the communications flow.

In some implementations, process 300 includes additional blocks (or steps). For example, in some implementations, while monitoring the communications flow, process 310 stores the communications flow (e.g., data sets of the communications flow that have been received and analyzed by a communications flow analysis system implementing process 300) at a data store. Additionally, in some implementations, process 300 can include a block at which information related to a communications flow (e.g., bases for determinations that the communications flow is of interest and should be retained) is stored at a database or other data store. For example, a communications flow analysis system implementing process 300 can assign an identifier to the communications flow and include that identifier in any flow tickets injected into the communications flow (e.g., within an extraneous data set injected into the communications flow). Furthermore, the communications flow analysis system can store the information within the database relative to the identifier such that the identifier can be used to access the information at the database.

Moreover, in some implementations, process 300 can include a block at which authentication information for an extraneous data set is generated and included within the extraneous data set. For example, process 300 can include a block at which a signature of a flow ticket to be included within the extraneous set injected into the communications flow is generated. The signature can be, for example, a hash or digest of the flow ticket that is encrypted using a cryptographic key such as a private cryptographic key of a public/private cryptographic key pair of the communications flow analysis system implementing process 300. The authentication information can also include a digital certificate signed by a certificate authority and issued to or associated with the communications flow analysis system implementing process 300. The digital certificate can include the public key of the public/private cryptographic key pair of the communications flow analysis system implementing process 300.

Accordingly, a communications flow analysis system analyzing the communications flow when stored at a data store can authenticate the flow ticket using the authentication information to verify that the extraneous data set including the flow ticket was injected into the communications flow by a communications flow analysis system. That is, the communications flow analysis system analyzing the communications flow when stored at a data store can generate a hash or digest of the flow ticket, decrypt the encrypted hash or digest, and compare the generated hash or digest with the decrypted hash or digest. If the generated hash or digest is the same as the decrypted hash or digest, the flow ticket can be said to be authenticated.

FIG. 4 is a flowchart of a communications flow analysis process, according to an implementation. Process 400 can be implemented at, for example, a communications flow analysis system hosted at a computing system. A communications flow is selected at block 410. For example, a communications flow analysis system implementing process 400 can determine which communications flows stored at a data store have terminated, and select at block 410 a communications flow at the data store that has terminated.

That communications flow is then processed at block 420. For example, a communications flow analysis system implementing process 400 can parse control parameters of data sets such as data packets of the communications flow to identify extraneous data sets such as duplicate data packets within the communications flow. As a specific example, a communications flow analysis system implementing process 400 can process the communications flow according to a protocol implemented by a destination of the communications flow to identify data packets of the communications flow that would be discarded by the destination. The communications flow analysis system implementing process 400 can then access a content portion of such data packets to determine whether those data packets include a flow ticket.

In some implementations, an extraneous data set (or a flow ticket within an extraneous data set) includes authentication information and/or an identifier of a flow ticket. Accordingly, in come implementations, process 400 includes one or more blocks at which an identifier and/or authentication information is accessed at the extraneous data set. Moreover, a flow ticket can be authenticated using the authentication information (e.g., verify a signature of a flow ticket using a certificate), and the flow ticket identified if the flow ticket is authenticated.

In the example illustrated in FIG. 4, if a flow ticket is not identified (e.g., no extraneous data set is identified or a flow ticket cannot be authenticated) during the processing at block 420, process 400 proceeds to block 440 at which the communications flow is removed from the data store, for example, to free storage space for additional communications flows. In other words, if the communications flow has not been marked or flagged with an extraneous data set (or a flow ticket within an extraneous data set) as of interest, the communications flow can be deleted from the data store. Process 400 can then proceed to block 410 to select another communications flow.

If a flow ticket is identified within the communications flow, the communications flow is not removed from the data store. In some implementations, the communications flow can be moved to another data store or another portion of a data store (e.g., another directory of a file system or another storage volume), and process 400 then proceeds to block 410 to select another communications flow. In some implementations, the communications flow can be flagged (e.g., within a database or journal file) for subsequent analysis, and process 400 then proceeds to block 410 to select another communications flow.

As illustrated in FIG. 4, in some implementations, the communications flow is analyzed at block 480 if at flow ticket is identified within the communications flow selected at block 410. For example, a communications flow analysis system implementing process 400 can perform compliance analysis on the communications flow. That is, for example, the communications flow analysis system can audit the communications flow for compliance with policies such as security policies or with various protocols. As another example, the communications flow analysis system can perform deep packet inspection analysis on the flow to determine whether undesired activity occurred via the communications flow. In some implementations, information related to the communications flow that is included within the flow ticket can be accessed during the analysis.

Moreover, in some implementations, information related to the communications flow that was stored at a database by a communications flow analysis system that monitored the communications flow can be accessed by a communications flow analysis system implementing process 400 during the analysis using, for example, an identifier of the flow ticket (or communications flow) included in the flow ticket. In some implementations, a single communications flow analysis system monitors the communications flow (e.g., implements process 300) and implements process 400. Thus, one component (e.g., a module or group of modules) of a communications flow analysis system can implement process 400, and another component can monitor communications flows (e.g., in real-time).

Because the communications flow analysis system that monitored the communications flow can store information at a portion of the database associated with the communications flow (or with the flow ticket based on the identifier) over time, the communications flow analysis system implementing process 400 can access this information to provide an enhanced analysis of the communications flow. For example, the communications flow analysis system that monitored the communications flow can store various determinations or observations (e.g., temporal information related to the communications flow) related to the communications flow, and the communications flow analysis system implementing process 400 can use such determinations or observations as input to the analysis or analyses at block 480. After block 480, process 400 then proceeds to block 410 to select another communications flow. In some implementations, the communications flow can be removed from the data store after the communications flow has been analyzed.

Processes 300 and 400 discussed above in relation to FIGS. 3 and 4 are example implementations. Accordingly, other implementations can include additional, fewer, or rearranged blocks such as those discussed above and others.

Figure 5:
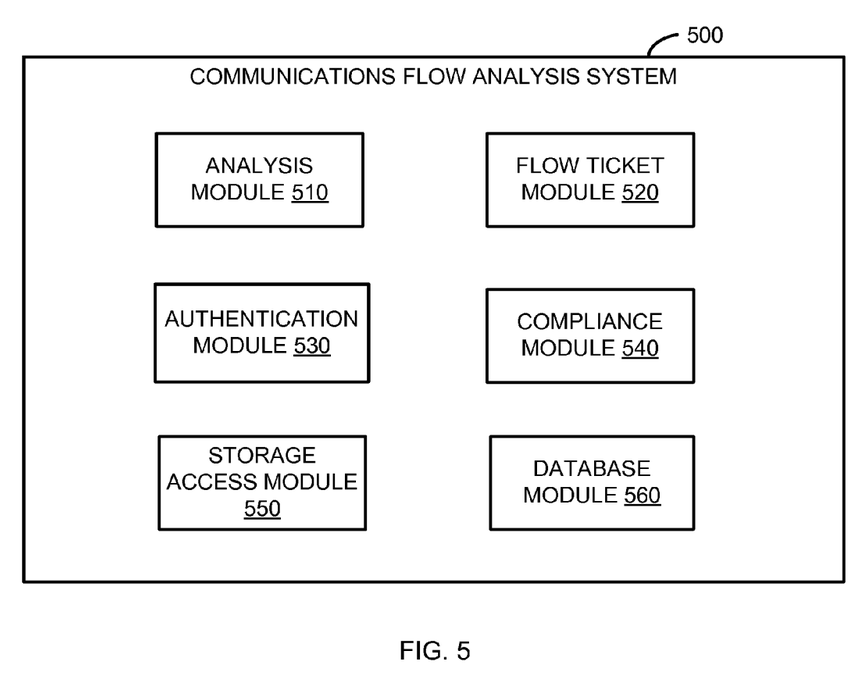
FIG. 5 is an illustration of a communications flow analysis system, according to an implementation.

FIG. 5 is an illustration of a communications flow analysis system, according to an implementation. Communications flow analysis system 500 includes flow processing module 510, flow ticket module 520, authentication module 530, compliance module 540, storage access module 550, and database module 560.

Figure 6:
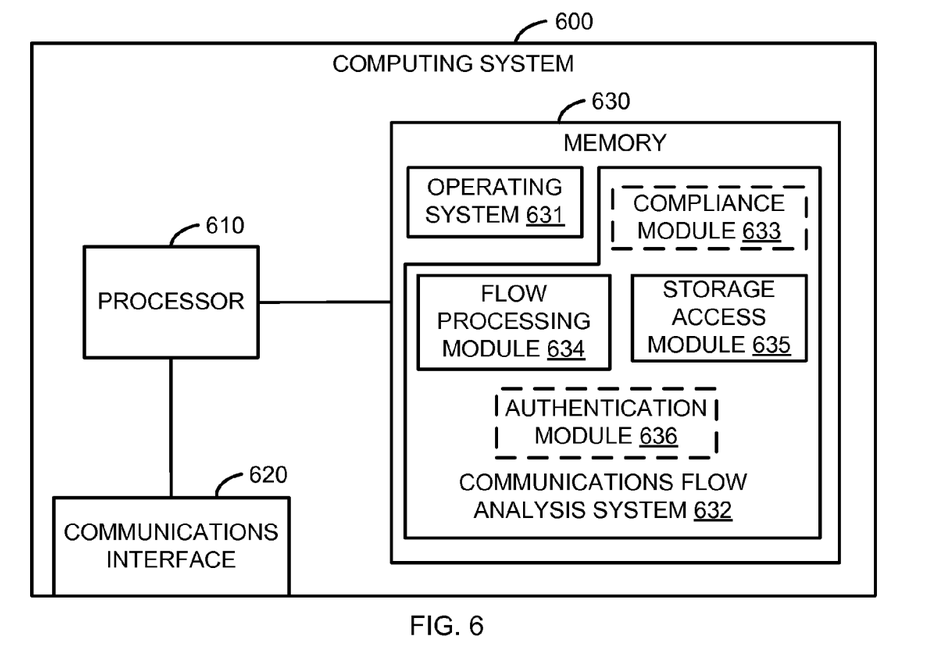
FIG. 6 is a schematic block diagram of a communications flow analysis system hosted at a computing system, according to an implementation.
Figure 7:
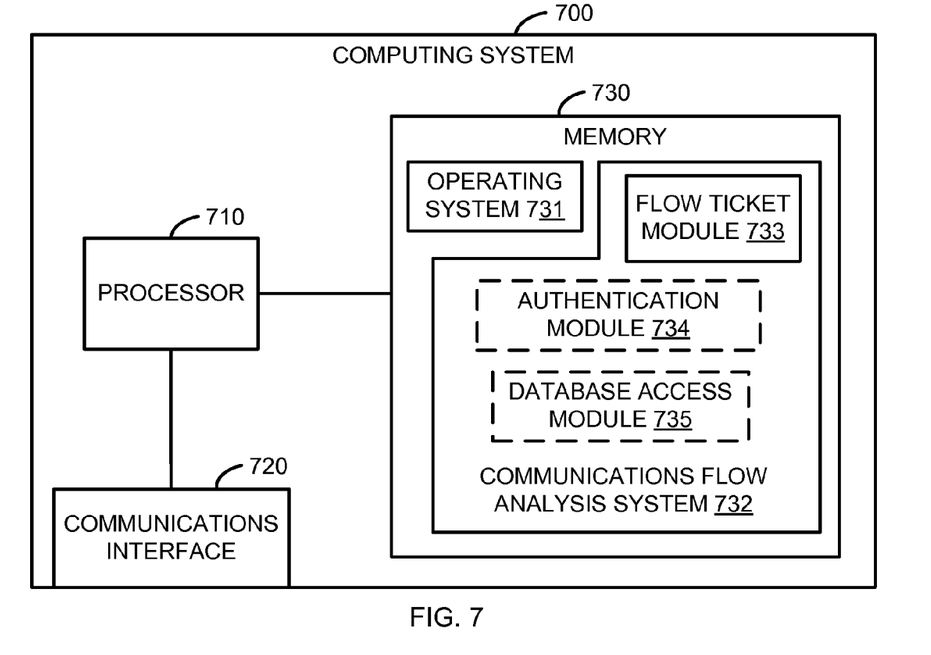
FIG. 7 is a schematic block diagram of another communications flow analysis system hosted at a computing system, according to another implementation.

Although various modules (i.e., combinations of hardware and software) are illustrated and discussed in relation to FIGS. 5-7 and other example implementations, other combinations or sub-combinations of modules can be included within other implementations. Said differently, although the modules illustrated in FIGS. 5-7 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. Furthermore, some implementations can include one subset of the modules illustrated, for example, in FIG. 5, and other implementations can include another subset or other subsets of the modules illustrated in FIG. 5.

Flow processing module 510 determines whether a communications flow includes a flow ticket. For example, flow processing module 510 can communicate with storage access module 550 to access a communications flow at a data store, and can parse or process the communications flow to determine whether the communications flow includes an extraneous data set and whether that extraneous data set includes a flow ticket. Moreover, flow processing module 510 can use authentication information with an extraneous data set to authenticate a flow ticket. In some implementations, flow processing module 510 also determines whether a communications flow stored at a data store has terminated.

Flow ticket module 520 monitors a communications flow to determine whether the communications flow is of interest. For example, flow ticket module 520 can include one or more modules (or engines) such as an intrusion detection engine, an intrusion prevention engine, an application visibility engine, a data leak detection engine, an application content visibility engine, a malware detection engine, an application firewall engine, or application proxy engine to identify activity related to intrusion, exposed application data or features, malware, firewall violations, or proxy violations, for example.

Additionally, flow ticket module 520 can inject extraneous data sets such as one or more duplicate data packets including a flow ticket to identify a communications flow of interest. As discussed above, such data packets can have particular values within control parameters of those data packets, and flow ticket module 520 can generate or modify the data packets to include those particular values at those control parameters.

In some implementations, authentication module 530 generates authentication information (e.g., a signature of a flow ticket) for a flow ticket. For example, authentication module 530 can define a digest by applying a hash function to a flow ticket, and generate a signature of the flow ticket by applying a private cryptographic key such as a private cryptographic key of a public/private cryptographic key pair of a communications flow analysis system. Authentication module 530 can then provide the signature of the flow ticket and a digital certificate (including a public key of the public/private cryptographic key pair) signed by a certificate authority and issued to or associated with the communications flow analysis system to flow ticket module 520 to be included within an extraneous data set with the flow ticket.

In some implementations, in addition to or exclusive of generating authentication information, authentication module 530 verifies authentication information. That is, authentication module 530 authenticates a flow ticket using authentication information included within an extraneous data set identified within a communications flow. Referring to the digital signature discussed above, authentication module 530 can compute a digest of a flow ticket within an extraneous data set, decrypt the signature included within the extraneous data set using the public key within the certificate, and authenticate the flow ticket if the decrypted signature is the same as the computed digest.

Compliance module 540 performs compliance analysis on communications flows such as communications flows stored at a data store that include a flow ticket within an extraneous data set. For example, in addition to other examples of compliance analysis described herein, compliance module 540 can audit a communications flow for errors, undesired or prohibited activity, and/or other analyses. Additionally, in some implementations, compliance module 540 can access information related to a communications flow at a flow ticket included in the communications flow and/or at a database via database module 560.

Storage access module 550 provides access to one or more data stores. Accordingly, communications flow analysis system 500 can store and/or access communications flows at data stores via storage access module 550. Additionally, storage access module 550 can remove (or delete) communications flows from a data store. For example, storage access module 550 can include logic to access data stores such as file systems, volumes, relational databases, object databases, cloud- or network-based data stores, and/or other data stores.

Database module 560 provides an interface to one or more databases. Accordingly, communications flow analysis system 500 (or components thereof) can access a database via database module 560. In some implementations, database module 560 is integrated with storage access module 550.

As discussed above, some communications flow analysis systems include fewer than all the components (e.g., modules) illustrated in FIG. 5. For example, some communications flow analysis systems include components to monitor communications flows and inject extraneous data sets into communications flows, but not components to identify extraneous data sets within communications flows. As another example, some communications flow analysis systems include components to identify extraneous data sets within communications flows, but not components to monitor a communications flow and inject extraneous data sets into communications flows. FIG. 6 is an example of a communications flow analysis system that includes components to identify extraneous data sets within communications flows, and FIG. 7 is an example of a communications flow analysis system that includes components to monitor communications flows and inject extraneous data sets into communications flows.

FIG. 6 is a schematic block diagram of a communications flow analysis system hosted at a computing system, according to an implementation. In the example illustrated in FIG. 6, computing system 600 includes processor 610, communications interface 620, and memory 630. Processor 610 is any combination of hardware and software that executes or interprets instructions, codes, or signals. For example, processor 610 can be a microprocessor, an application-specific integrated circuit (ASIC), a distributed processor such as a cluster or network of processors or computing systems, a multi-core or multi-processor processor, or a virtual or logical processor of a virtual machine.

Communications interface 620 is a module via which processor 610 can communicate with other processors or computing systems via communications link. For example, communications interface 620 can include a network interface card and a communications protocol stack hosted at processor 610 (e.g., instructions or code stored at memory 630 and executed or interpreted at processor 610 to implement a network protocol) to receive data set of a communications flow and send extraneous data sets. As specific examples, communications interface 620 can be a wired interface, a wireless interface, an Ethernet interface, a Fiber Channel interface, an InfiniBand interface, and IEEE 802.11 interface, or some other communications interface via which processor 610 can exchange signals or symbols representing data to communicate with other processors or computing systems.

Memory 630 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 630 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. Said differently, memory 630 can represent multiple processor-readable media. In some implementations, memory 630 can be integrated with processor 610, separate from processor 610, or external to computing system 600.

Memory 630 includes instructions or codes that when executed at processor 610 implement operating system 631 and communications flow analysis system 632. In the example illustrated in FIG. 6, communications flow analysis system 632 includes flow processing module 634 and storage access module 635. In some implementations, communications flow analysis system 632 also includes compliance module 633 and authentication module 636.

In some implementations, computing system 600 can be a virtualized computing system. For example, computing system 600 can be hosted as a virtual machine at a computing server. Moreover, in some implementations, computing system 600 can be a virtualized computing appliance, and operating system 631 is a minimal or just-enough operating system to support (e.g., provide services such as a communications protocol stack and access to components of computing system 600 such as communications interface 620) communications flow analysis system 632.

Communications flow analysis system 632 can be accessed or installed at computing system 600 from a variety of memories or processor-readable media. For example, computing system 600 can communications flow analysis system 632 at a remote processor-readable medium via communications interface 620. As a specific example, computing system 610 can be a thin client that accesses operating system 630 and communications flow analysis system 632 during a boot sequence.

As another example, computing system 600 can include (not illustrated in FIG. 6) a processor-readable medium access device (e.g., CD, DVD, SD, MMC, or a CF drive or reader), and can access communications flow analysis system 632 at a processor-readable medium via that processor-readable medium access device. As a more specific example, the processor-readable medium access device can be a DVD drive at which a DVD including an installation package for one or more components of communications flow analysis system 632 are accessible. The installation package can be executed or interpreted at processor 600 to install one or more components of communications flow analysis system 632 at computing system 600 (e.g., at memory 630). Computing system 600 can then host or execute one or more components of communications flow analysis system 632.

In some implementations, components (e.g., flow processing module 634, storage access module 635, compliance module 633, and authentication module 636) of communications flow analysis system 632 can be accessed at or installed from multiple sources, locations, or resources. For example, some components of communications flow analysis system 632 can be installed via a communications link, and other components of communications flow analysis system 632 can be installed from a DVD.

In other implementations, components of communications flow analysis system 632 can be distributed across multiple computing systems. That is, some components of communications flow analysis system 632 can be hosted at one computing system and other components of communications flow analysis system 632 can be hosted at another computing system. As a specific example, flow processing module 634, storage access module 635, compliance module 633, and authentication module 636 can be hosted within a cluster of computing systems where each of flow processing module 634, storage access module 635, compliance module 633, and authentication module 636 is hosted at multiple computing systems, and no single computing system hosts each of flow processing module 634, storage access module 635, compliance module 633, and authentication module 636.

FIG. 7 is a schematic block diagram of another communications flow analysis system hosted at a computing system, according to another implementation. Computing system 700 is similar to computing system 600. That is, processor 710, communications interface 720, memory 730, and operating system 731 are similar to processor 610, communications interface 620, memory 630, and operating system 631. In contrast to computing system 600, computing system 700 includes communications flow analysis system 732. Communications flow analysis system 732 includes flow ticket module 733 to monitor communications flows accessible via communications interface 720, to determine whether such communications flows are of interest, and to inject extraneous data sets into communications flows of interest. Additionally, in some implementations, communications flow analysis system 732 includes authentication module 734 and database access module 735.

Thus, communications flow analysis system 732 can monitor communications flows and inject extraneous data sets into communications flow of interest; and communications flow analysis system 632 can identify communications flows that include extraneous data sets at a data store and remove communications flows that do not include extraneous data sets from the data store. In some implementations, communications flow analysis system 732 and communications flow analysis system 632 can be referred to as portions of a single communications flow analysis system. For example, communications flow analysis system 732 and communications flow analysis system 632 can agents or daemons of a communications flow analysis system that are hosted, respectively, at computing system 700 and computing system 600. In other implementations, communications flow analysis system 732 and communications flow analysis system 632 can be referred to as separate communications flow analysis systems.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanism (e.g., sending an interface description to a scanner via a communications path or channel), pull mechanisms (e.g., delivering an interface description to a scanner in response to a request from the scanner), and store mechanisms (e.g., storing an interface description at a data store or service at which a scanner can access the interface description). Furthermore, as used herein, the term "based on" means "based at least in part on." Thus, a feature that is described as based on some cause, can be based only on the cause, or based on that cause and on one or more other causes.

What is claimed is:

1. A non-transitory processor-readable medium storing instructions that when executed cause a system comprising a physical processor to:
   determine that a communications flow of data packets between a source and a destination should be retained; and
   inject an extraneous data set into the communications flow in response to determining that the communications flow should be retained, the extraneous data set comprising an extraneous data packet that comprises a duplicate portion that is duplicated from a portion of a first data packet of the data packets of the communications flow, wherein the injecting causes sending of the extraneous data packet to the destination along with the data packets of the communications flow.

2. The processor-readable medium of claim 1,
   wherein each of the data packets of the communications flow comprises a destination address identifying the destination; and
   wherein the extraneous data packet comprises the destination address identifying the destination.

3. The processor-readable medium of claim 1,
   wherein the duplicate portion of the extraneous data packet comprises a copy of a first control parameter of the first data packet.

4. The processor-readable medium of claim 3,
   wherein the extraneous data packet comprises another control parameter that is different from the first control parameter of the first data packet.

5. The processor-readable medium of claim 1, wherein:
   the extraneous data set comprises a flow ticket having authentication information for the flow ticket.

6. The processor-readable medium of claim 1, wherein the extraneous data set comprises a flow ticket, the processor-readable medium further storing instructions that when executed cause the system to:
   store information associated with the flow ticket in a portion of a database associated with the flow ticket.

7. A method comprising:
   receiving, by a destination system comprising a physical processor, data packets of a communications flow, the data packets addressed from a source system to the destination system;
   determining, by the destination system, whether the data packets of the communications flow comprise an extraneous data packet that comprises a flow ticket, the extraneous data packet injected into the communications flow by a flow analysis system disposed between the source system and the destination system; and
   removing, by the destination system, the communications flow from a data store responsive to a determination that the communications flow does not comprise the extraneous data packet that comprises the flow ticket.

8. The method of claim 7, further comprising parsing, by the destination system, the extraneous data packet to find the flow ticket.

9. The method of claim 7, further comprising performing, by a compliance module in the destination system, compliance analysis on the communications flow responsive to a determination that the communications flow comprises the extraneous data packet that comprises the flow ticket.

10. The method of claim 7, further comprising authenticating, by an authentication module in the destination system, the flow ticket using authentication information in the extraneous data packet.

11. A communications flow analysis system, comprising:
    at least one physical processor; and
    a flow ticket module executable on the at least one physical processor to:
       determine that a communications flow of data packets from a source to a destination should be retained, and
       in response to determining that the communications flow should be retained, inject an extraneous data packet comprising a flow ticket into the communications flow, the extraneous data packet comprising a duplicate portion that is duplicated from a portion of a first data packet of the data packets of the communications flow, wherein the injecting causes sending of the extraneous data packet to the destination along with the data packets of the communications flow, wherein the data packets of the communications flow each comprises a destination address identifying the destination, and wherein the extraneous data packet comprises the destination address identifying the destination.

12. The system of claim 11, wherein the extraneous data packet comprises a first control parameter that is a copy of a first control parameter of the first data packet.

13. The system of claim 12, wherein the extraneous data packet comprises a second control parameter that is different from a second control parameter of the first data packet.

14. The system of claim 11, further comprising a database module to store information associated with the flow ticket in a portion of a database associated with the flow ticket.

15. The system of claim 11,
   wherein the flow ticket module is executable to generate the flow ticket that includes authentication information within the flow ticket.

16. The processor-readable medium of claim 1, wherein the flow ticket comprises an identifier of the flow ticket and authentication information calculated by applying a function on content of the flow ticket.

17. The method of claim 7, wherein the extraneous data packet comprises a duplicate portion that is copied by the flow analysis system from a corresponding portion of a first data packet of the data packets of the communications flow.

18. The method of claim 17, wherein the duplicate portion in the extraneous data packet comprises duplicate control parameters of control parameters in the given data packet.

19. The method of claim 17, further comprising:
   disregarding, by a protocol layer of the destination system, the extraneous data packet in response to the extraneous data packet comprising the duplicate portion of the corresponding portion of the given data packet.

20. The method of claim 7, wherein the data packets, comprising the extraneous data packet, of the communications flow each comprises a destination address that identifies the destination system.

* * * * *